Aug. 16, 1949.  R. G. ROSHONG  2,479,265
FLUID SEAL
Filed Dec. 29, 1944
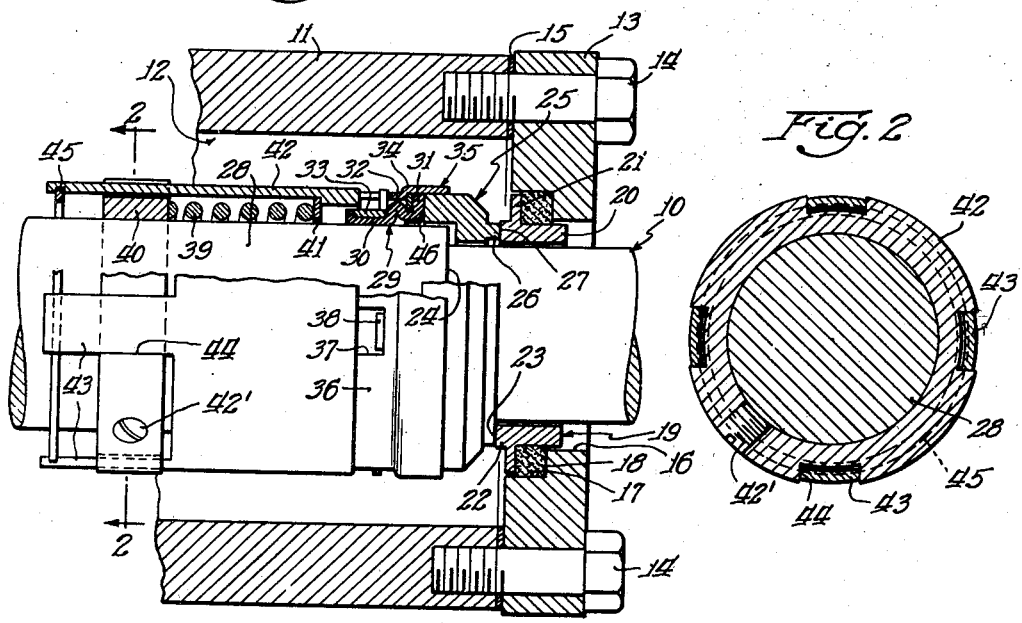
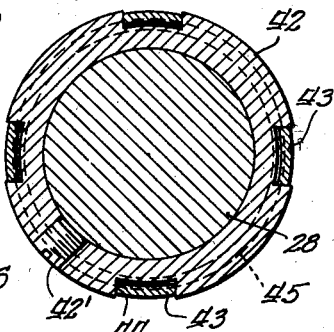
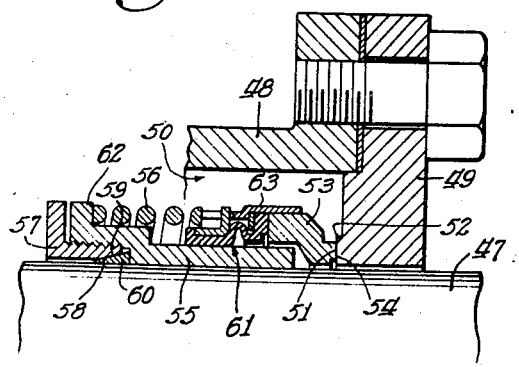
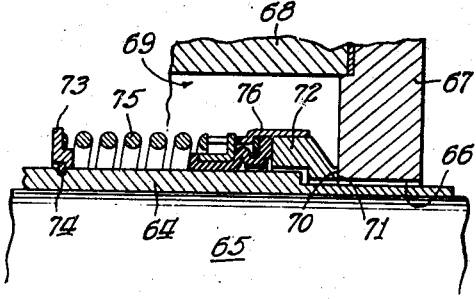
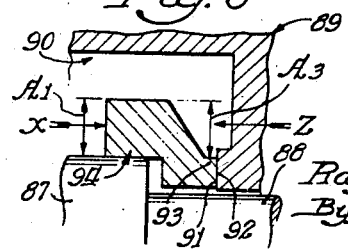
Inventor:
Raymond G. Roshong Patented Aug. 16, 1949

2,479,265

UNITED STATES PATENT OFFICE 2,479,265

FLUID SEAL

Raymond G. Roshong, North Hollywood, Calif., assignor to Crane Packing Company, Chicago, Ill., a corporation of Illinois Application December 29, 1944, Serial No. 570,384

1 Claim. (Cl. 286—11)

This invention relates to fluid seals for chambers defined by two relatively rotatable machine elements and particularly to such seals commonly known as "rotary" seals.

Rotary seals have been proposed which are comprised of a pair of sealing rings, one fixed to one of a pair of relatively rotatable machine elements and the other secured to the other machine element, with suitable sealing means between the rings and elements. In one form one of the rings is attached to a bellows made from a synthetic rubber and the bellows is in turn secured to the element, the bellows serving to permit the ring to move freely in response to axial and transverse vibrations of the element. A spring or other resilient means is used to maintain a predetermined minimum pressure between the rings.

In designs heretofore proposed the ring secured to the bellows was so constructed and mounted that it was subjected to a net fluid pressure acting in the direction of the sealing surfaces so that the contacting surfaces of the rings developed more friction than was necessary to form a fluid-tight joint. For average installations this additional friction is not serious, but when the pressures exceed say fifty pounds per square inch, the power loss occasioned by the seal becomes objectionably high. The increased friction also results in a materially reduced life of the sealing rings, thereby necessitating more frequent repairs and shut-down of machinery.

The principal object of this invention is to provide a fluid seal of the rotary type which is so designed that the contacting surfaces of the sealing rings are subjected to a predetermined proportion of the unit pressure existing in the chamber to be sealed, the proportions available varying from zero to the unit pressure existing in the chamber.

Another object of this invention is to provide a rotary seal utilizing a sealing ring which is adapted to be secured to a shaft by a flexible sleeve or the like, the point of attachment to the shaft being at a radius which is equal to or slightly less than the maximum radius of the effective sealing surface so that the fluid pressure acting upon one side of the ring is equal to or slightly less than the fluid pressure acting upon the other side of the ring.

A more specific object of this invention is to provide a sealing ring for a rotary seal of improved design, the ring being formed with a sealing surface which is disposed at an appreciable distance radially inward of its outer periphery in order to leave an annular region outside the sealing surfaces to act as a piston to balance all or a portion of the fluid pressure action upon the back of the ring.

Another specific object of this invention is to provide a support for the sealing ring of a rotary seal which will reduce the effective piston area of the ring exposed to the fluid pressure tending to hold the ring against its cooperating sealing surface.

These and other objects and features of this invention will become apparent from the description which follows and from the accompanying drawings forming a part thereof in which:

Figure 1 is an elevation in section of a rotary seal constructed in accordance with this invention and adapted to be used with a shaft having a shoulder formed therein;

Figure 2 is a side elevation of the driving means for the ring;

Figure 3 is a partial elevation in section of a modification of the seal of Fig. 1 showing how a seal made in accordance with this invention can be applied to a shaft which does not have a shoulder;

Figure 4 is a partial elevation in section of yet another modification;

Figure 5 is a schematic view of a substantially unbalanced seal; and

Figure 6 is a schematic view corresponding to Fig. 5 showing a substantially balanced seal.

Referring first to Figs. 5 and 6 for a brief explanation of the fundamental principles of balancing fluid pressures, there is shown in Fig. 5 a shaft 80 which rotates relative to a structure 81 and forms therewith a chamber 82 (shown only in part) of any desired configuration, said chamber 82 being filled with fluid under pressure. Structure 81 has a sealing surface 83 cooperating with a sealing surface 84 formed in the nose 85 of a sealing washer 86. Said washer is slidable on shaft 80 and has a fluid-tight connection therewith, either by reason of a close fit or by the application of suitable sealing means (not shown).

It is apparent that washer 86 has an area A, exposed to the fluid in chamber 82 which results in a total pressure X on the washer in the direction indicated, and an area $A_2$ which results in a total pressure Y on the washer in the opposite direction. Since area $A_1$ is obviously larger than area $A_2$, the net fluid pressure will be in a direction to hold the washer sealing surface 84 against sealing surface 83 and hence the washer is unbalanced hydraulically. It is apparent likewise that an increase in area $A_2$ can be made only at the sacrifice of a corresponding area of sealing surface 84 and that a complete balance therefore cannot be achieved.

In Fig. 6 there is shown a shaft 87 having a portion of reduced diameter 88 which passes through and rotates relative to a structure 89 and forms therewith a chamber 90 (shown only in part) of any desired configuration, said chamber being filled with fluid under pressure. A sealing surface 91 is formed on structure 89 which cooperates with a sealing surface 92 formed on the nose 93 of a washer 94. As in the case of washer 86 of Fig. 5, said washer 94 has a fluid-tight connection with shaft 87.

It will be noted that washer 94 differs fundamentally from washer 86 in that the nose 93 of washer 94 is offset and operates over the reduced portion 88 of shaft 87. Thus, although washer 94 has an area $A_1$ which is identical to area $A_1$ of washer 86, the opposing area $A_3$ is considerably larger than area $A_2$ of washer 86 and hence the fluid pressure X is opposed by a larger fluid pressure Z which may substantially balance pressure X. By this construction an increase can be made in the area $A_3$ without sacrificing any of the area of sealing surface 92 and hence any degree of balance or even of overbalance is possible with a design such as is shown in Fig. 6.

Referring now to Figures 1 and 2 for a detailed description of this invention, there is shown a shaft 10 which rotates in a housing or frame 11 defining with shaft 10 a chamber 12 (shown only partially) closed at its right-hand side (Fig. 1) by a closure plate 13, said plate 13 being secured to frame 11 by means of bolts 14 or other fasteners. A gasket 15 is inserted between housing 11 and plate 13 to form a fluid-tight joint thereat. Closure plate 13 has an opening 16 through which shaft 10 passes, the opening being enlarged at 17 to receive a compressible ring 18 of material impervious to the fluid to be sealed. A sealing ring 19 is supported from compressible ring 18, said ring 19 having a cylindrical portion 20 and a flange portion 21, the cylindrical portion extending beyond compressible ring 18 and having considerable clearance with respect to both the shaft 10 and opening 16 to permit it to adjust itself to misalignment or weaving of the shaft. At its left-hand end (Fig. 1) ring 19 protrudes beyond flange 21 in the form of a nose 22 having a ground and lapped sealing surface 23 in chamber 12.

Shaft 10 has a shoulder 24 which is spaced from ring 19 and in the space so formed is disposed a sealing ring 25, said ring being formed with a nose 26 extending laterally toward ring 19 and provided with a lapped sealing surface 27 which abuts sealing surface 23 and forms therewith a substantially fluid-tight joint. It is this joint which is relied on to seal the rotating shaft from the stationary closure plate 13.

Ring 25 fits loosely upon shaft 10 so that it can move freely thereon toward ring 19. It is sealed upon the enlarged portion 28 of shaft 10 by means of a sleeve 29 preferably made of flexible resilient material impervious to the fluid to be sealed, such as synthetic rubber. Said sleeve 29 is formed with a cylindrical part 30 at one end, a radially disposed flange 31 abutting the back of sealing ring 25 and a bellows 32. Cylindrical portion 30 is compressed upon the shaft by a rigid band 33, and flange 31 is held against ring 25 by a washer 34. A rigid shell 35 surrounds sleeve 29 and a portion of ring 25 and has a suitable driving connection (not shown) with ring 25. Said shell 35 has a stepped section 36 forming a shoulder which bears against washer 34, and one or more slots 37 in which are received lugs 38 extending from band 33 to form a sliding driving connection between the band and shell. Thus sealing ring 25 is driven from enlarged portion 28 of shaft 10 by substantially positive means which is independent of bellows 32.

The force for urging ring 25 against ring 19 is supplied by a spring 39 which is compressed between a ring 40 held fast on shaft 10 by a screw 42 (Fig. 2) or other means and a washer 41 resting against a shoulder in a sleeve 42. Alternatively, shaft 10 may be formed with a flange disposed and shaped like ring 40. Sleeve 42 in turn rests against the left-hand end (Fig. 1) of shell 35 so that the spring pressure is transmitted directly to washer 34, flange 31 and sealing washer 25. Sleeve 42 is driven from shaft 10 by fingers 43 extending rearwardly from sleeve 42 and engaging slots 44 in ring 40. A snap ring 45 limits the movement of sleeve 42 toward the right (Fig. 1).

To prevent the portion of sleeve 29 immediately adjacent flange 31 from freezing to shaft 10, a ferrule 46, fitting loosely on the shaft, is placed under the said portion prior to inserting sealing washer 25 into shell 35.

After the seal is assembled on the shaft and is ready for operation spring 39 will supply the pressure required to hold sealing washer 25 against ring 19 in fluid-tight contact, whether or not there is any fluid pressure in chamber 12 and whether or not shaft 10 is rotating. This spring pressure is the minimum pressure to which the seal will be subjected at any time. When fluid pressure is introduced into chamber 12, all parts of the seal exposed to the fluid will of course be subjected to the unit pressure developed in the fluid. Thus the whole of washer 25 outside nose 26 is subjected to this pressure and will function as a piston tending to separate the sealing surfaces. This separating force is opposed by the fluid pressure acting upon the other side of the washer 25 and, of course, by the spring 39. The magnitude of the opposing fluid pressure is determined by the effective area of the washer exposed to the fluid, which area, in the seal construction shown, is substantially that defined by the inner diameter of ferrule 46 and the outer diameter of washer 25. This results from the fact that ferrule 46 acts to stiffen the portion of sleeve 29 included between the ferrule and washer 34, so that it becomes effective to transmit fluid pressure along with washer 34. Thus by selecting the proper outside diameter for the sealing surface 27 on washer 25 some or all of the fluid pressure acting upon the back of this washer can be balanced out and the total pressure serving to hold the sealing surfaces together can be reduced to a fraction of its unbalanced value. It is also possible to make the balancing area greater than the effective area behind washer 25 so that when a predetermined fluid pressure is reached in chamber 12 the surfaces 23 and 27 will part, thus relieving the pressure and performing the function of a relief valve in addition to that of a seal.

The form shown in Fig. 1 can be used wherever a shaft with a stepped or reduced portion is available. Where such a shaft is undesirable, the constructions shown in Figs. 3 and 4 can be used.

Considering first the Fig. 3 construction, the shaft 47 is mounted in a housing 48 and, with closure plate 49, defines a chamber 50 which contains fluid under pressure. Instead of a floating ring such as ring 19 of Fig. 1, a sealing surface 51 is ground and lapped upon an annular rib 52 formed integrally with closure plate 49. A sealing washer 53, similar in construction to washer 25 of Fig. 1 is provided with a lapped sealing surface 54 which cooperates with surface 51 to form a substantially fluid-tight joint for chamber 50.

Shaft 47 does not have a stepped portion, but the effect of one is obtained by a sleeve 55 having an outside diameter equal to the outside diameter of stepped portion 28 of Fig. 1. The sleeve is belled at its left-hand end (Fig. 3) to support a spring 56 on its outside surface, the inside of the belled portion being threaded to receive a clamping nut 57. Said nut 57 has a conical surface 58 which cooperates with a corresponding conical surface 59 on a wedge ring 60 in the belled portion of sleeve 55 to hold said sleeve fast on shaft 47 and also to form a fluid-tight joint between the sleeve and shaft. Washer 53 is secured to sleeve 55 by a sealing and driving mechanism indicated generally by the reference character 61, the mechanism being substantially identical to that shown in Fig. 1.

As in the previous form, the balancing fluid pressure is that acting upon the portion of ring 53 outside of surface 51 and it can be made less than, equal to, or greater than the opposing fluid pressure as desired, by selecting the proper outside diameter for the surface 51 in the manner described with reference to Fig. 1. The shaft, however, need not be altered in any way to accommodate this seal and, in addition, the spring 56 can be compressed directly between a flange 62 on the belled portion of the sleeve and the shell 63 of the driving mechanism 61, thus simplifying the construction of the driving mechanism. The seal may be assembled upon sleeve 55 at the factory and shipped and installed as a unit, the mechanic merely locating the sleeve properly on the shaft and then tightening locknut 57.

The form shown in Fig. 4 likewise does not require a shaft with a stepped portion, but differs from that shown in Fig. 3 in that it takes advantage of a long sleeve which may be required on the shaft for some other reason. The sleeve is shown at 64 press-fitted upon shaft 65. Both shaft 65 and sleeve 64 pass through an opening 66 in closure member 67 secured in any suitable manner to housing 68 and, with sleeve 64, defining a chamber 69. As in the Fig. 4 construction, one of the sealing surfaces 70 may be formed on an integral part of closure member 67 and the sealing washer 72 may have the same general shape as the previously described washers 53 of Fig. 3 and 25 of Fig. 1. Since sleeve 64 is already fast on shaft 65, the lock-nut of Fig. 3 can be dispensed with and a simple spring retainer ring 73 and snap ring 74 may be used instead as an abutment for spring 75, said spring acting directly upon the retainer shell 76 for ring 72.

The balancing force is supplied and predetermined in the Fig. 4 construction in the same manner as in the preceding two forms, the outside diameter of surface 71 being so selected with relation to the effective piston area behind washer 72 as to result in the desired balancing action.

It will be evident from the foregoing description that a seal construction has been disclosed which reduces, eliminates, or reverses the net fluid pressure acting upon the sealing surfaces of a rotary seal as desired and that the power required to drive the seal can be materially reduced and the life of the seal greatly prolonged. In a comparative test made with the usual unbalanced seal and a seal of the same size, but balanced in accordance with this invention, the power required to drive the balanced seal was one-fourth that required to drive the unbalanced seal. The seal can also be made to act as a relief valve as a safety feature.

It will be observed from the drawings that each washer 25, 53 and 72 is L-shaped in cross-section, one leg of the L acting as a balanced piston and the other supporting the sealing surface. The leg acting as a piston also serves at times to support the ring from the stepped region of the shaft. Various modifications of this generic shape are possible and will suggest themselves to those skilled in this art. Various materials and compositions of matter will also suggest themselves as suitable for use as washers.

It is understood that a floating ring such as 19 of Fig. 1 may be used with either of the alternative constructions shown in Figs. 3 and 4. It is understood further that the foregoing description is merely illustrative of a preferred embodiment of this invention and that the scope of this invention therefore is not to be limited thereto, but is to be determined by the appended claim.

What is claimed is:

A balanced seal for substantially preventing the flow of fluid from a chamber formed by a shaft and a housing therefor, said seal comprising an element on the housing encircling the shaft and having a sealing surface thereon, a washer adjacent to and substantially concentric with the element and having a sealing surface thereon adapted to cooperate with the sealing surface on the element, a stepped portion on the shaft, said sealing surfaces having inside and outside effective diameters which are less than the diameter of the stepped portion of the shaft, whereby to reduce the net fluid pressure urging the washer against the element, and means for supporting the washer from the stepped portion, said means comprising an expansible sleeve, means for securing one end of the sleeve to the stepped portion and for holding the other end against the washer to form a fluid seal between the washer and shaft, a rigid sleeve encircling the washer and having driving connections with the washer and with the end of the expansible sleeve secured to the shaft, an abutment on the shaft, and resilient means reacting against the abutment and the metal sleeve to urge the sleeve and associated washer toward the sealing surface.

RAYMOND G. ROSHONG.

REFERENCES CITED

The following references are of record in the file of this patent:

UNITED STATES PATENTS

| Number | Name | Date |
|---|---|---|
| 1,823,805 | Spreen | Sept. 15, 1931 |
| 1,825,918 | Peltier et al. | Oct. 6, 1931 |
| 1,866,967 | Durham | July 12, 1932 |
| 2,010,930 | Rowe | Aug. 13, 1935 |
| 2,087,313 | Bigelow et al. | July 20, 1937 |
| 2,249,188 | Stevenson | July 15, 1941 |
| 2,297,302 | Hornschuch | Sept. 29, 1942 |
| 2,305,726 | Meyer | Dec. 22, 1942 |
| 2,360,372 | Snyder | Oct. 17, 1944 |
| 2,365,946 | Bottomley | Dec. 12, 1944 |
| 2,373,463 | Curtis | Apr. 10, 1945 |

FOREIGN PATENTS

| Number | Country | Date |
|---|---|---|
| 157,116 | Switzerland | 1932 |
| 164,616 | Switzerland | 1934 |